(12) United States Patent
Han et al.

(10) Patent No.: US 12,261,703 B2
(45) Date of Patent: Mar. 25, 2025

(54) METHOD AND APPARATUS FOR CONFIGURING A SCHEDULING CONFIGURATION

(71) Applicant: LENOVO (BEIJING) LIMITED, Beijing (CN)

(72) Inventors: Jing Han, Beijing (CN); Haiming Wang, Beijing (CN); Lianhai Wu, Beijing (CN); Jie Shi, Beijing (CN); Jie Hu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 446 days.

(21) Appl. No.: 17/607,314

(22) PCT Filed: May 10, 2019

(86) PCT No.: PCT/CN2019/086465
§ 371 (c)(1),
(2) Date: Oct. 28, 2021

(87) PCT Pub. No.: WO2020/227864
PCT Pub. Date: Nov. 19, 2020

(65) Prior Publication Data
US 2022/0209906 A1    Jun. 30, 2022

(51) Int. Cl.
*H04L 1/1867*    (2023.01)
*H04L 1/1822*    (2023.01)
*H04W 72/23*    (2023.01)

(52) U.S. Cl.
CPC .......... *H04L 1/1887* (2013.01); *H04L 1/1822* (2013.01); *H04L 1/1896* (2013.01); *H04W 72/23* (2023.01)

(58) Field of Classification Search
CPC ... H04L 1/1887; H04L 1/1822; H04L 1/1896; H04W 72/23
See application file for complete search history.

(56) References Cited

U.S. PATENT DOCUMENTS

2019/0037539 A1*  1/2019  Jung ............... H04W 4/48
2020/0314889 A1* 10/2020  Cirik .............. H04W 72/23
(Continued)

FOREIGN PATENT DOCUMENTS

CN    107682925 A    2/2018
WO    2019005920 A1  1/2019

OTHER PUBLICATIONS

International Searching Authority, "Written Opinion of the International Searching Authority," PCT/CN2019/086465, Jan. 20, 2020, pp. 1-3.

(Continued)

*Primary Examiner* — Kevin M Cunningham
(74) *Attorney, Agent, or Firm* — Kunzler Bean & Adamson

(57) ABSTRACT

The present disclosure relates to a method and apparatus for configuring a scheduling configuration. The subject disclosure further provides a method comprising transmitting one or more scheduling configurations for a specific logical channel, wherein each scheduling configuration comprises at least one of: a periodicity, a factor for configured grant and an offset for HARQ process identity; and transmitting data according to a plurality of configured grants based on the one or more scheduling configurations.

20 Claims, 9 Drawing Sheets

(56) References Cited

U.S. PATENT DOCUMENTS

| 2021/0360647 A1* | 11/2021 | Xu ..................... H04L 5/0094 |
| 2021/0378006 A1* | 12/2021 | Takeda ................ H04L 1/1819 |
| 2022/0200740 A1* | 6/2022 | Zou ..................... H04L 1/188 |

OTHER PUBLICATIONS

Ericsson, Support for TSC Message Periodicities with Non-integer Multiple of CG/SPS Periodicities, 3GPP TSG-RAN WG1 Meeting #96bis, R1-1904133, Apr. 8-Apr. 12, 2019, pp. 1-3, Xi'an, China.
ZTE, Discussion on TSC message periodicity, 3GPP TSG RAN WG1 #96bis, R1-1904151, Apr. 8-12, 2019, pp. 1-3, Xi'an, China.
LG Electronics, Summary of 7.2.6.7 Others, 3GPP TSG RAN WG1 #96bis, R1-1905625, Apr. 8-12, 2019, pp. 1-13, Xi'an, China.

\* cited by examiner

METHOD AND APPARATUS FOR CONFIGURING A SCHEDULING CONFIGURATION

TECHNICAL FIELD

The subject application relates to a method and apparatus for configuring a scheduling configuration, in particular relates to a method and apparatus for configuring a scheduling configuration for New Radio (NR) Industrial Internet of Things (IIoT).

BACKGROUND OF THE INVENTION

Time-Sensitive Networking (TSN) is a set of standards under development by the TSN task group of the IEEE 802.1 working group. TSN addresses the transmission of very low transmission latency and high availability. Possible applications include converged networks with real time Audio/Video Streaming and real-time control streams which are used in automotive or industrial control facilities. Scheduling enhancement for TSN traffic is widely discussed at present. It is desirable to provide a solution to improve the scheduling the TSN traffic.

SUMMARY

One embodiment of the subject application provides a method comprising: transmitting one or more scheduling configurations for a specific logical channel, wherein each scheduling configuration comprises at least one of: a periodicity, a factor for configured grant and an offset for HARQ process identity; and transmitting data according to a plurality of configured grants based on the one or more scheduling configurations.

Another embodiment of the subject application provides a method comprising: receiving one or more scheduling configurations for a specific logical channel, wherein each scheduling configuration comprises at least one of: a periodicity, a factor for configured grant and an offset for HARQ process identity; and reserving resource for receiving data according to a plurality of configured grants based on the one or more scheduling configurations.

Yet another embodiment of the subject application provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method comprising: transmitting one or more scheduling configurations for a specific logical channel, wherein each scheduling configuration comprises at least one of: a periodicity, a factor for configured grant and an offset for HARQ process identity; and transmitting data according to a plurality of configured grants based on the one or more scheduling configurations.

Still another embodiment of the subject application provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method comprising: receiving one or more scheduling configurations for a specific logical channel, wherein each scheduling configuration comprises at least one of: a periodicity, a factor for configured grant and an offset for HARQ process identity; and reserving resource for receiving data according to a plurality of configured grants based on the one or more scheduling configurations.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Embodiments provide a method and apparatus for configuring a scheduling configuration. To facilitate understanding, embodiments are provided under specific network architecture and new service scenarios, such as 3GPP 5G, 3GPP LTE Release 8 and so on. Persons skilled in the art know very well that, with the development of network architecture and new service scenarios, the embodiments in the present disclosure are also applicable to similar technical problems.

Figure 1:
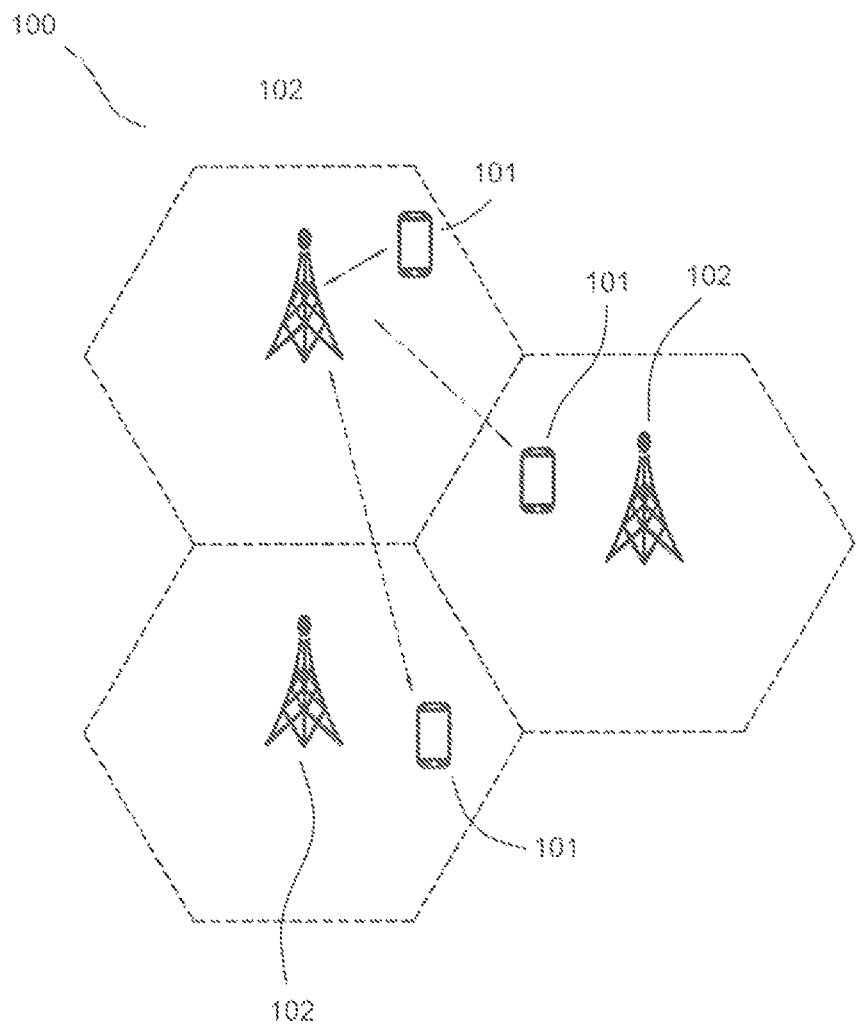
FIG. 1 illustrates a wireless communication system according to an embodiment of the present disclosure.

FIG. 1 depicts a wireless communication system 100 according to an embodiment of the present disclosure.

As shown in FIG. 1, the wireless communication system 100 includes User Equipment (UE) 101 and Base Stations (BS) 102. In particular, the wireless communication system 100 includes three UEs 101 and three BSs 102 for illustrative purpose only. Even though a specific number of UEs 101 and BSs 102 are depicted in FIG. 1, one skilled in the art will recognize that any number of UEs 101 and BSs 102 may be included in the wireless communication system 100.

The UEs 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present disclosure, the UEs 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UEs 101 include wearable devices, such as smart watches, fitness bands, optical head-mounted displays, or the like. Moreover, the UEs 101 may be referred to as a subscriber unit, a mobile, a mobile station, a user, a terminal, a mobile terminal, a wireless terminal, a fixed terminal, a subscriber station, a user terminal, or a device, or described using other terminology used in the art. The UEs 101 may communicate directly with the BSs 102 via uplink (UL) communication signals.

The BSs 102 may be distributed over a geographic region. In certain embodiments, each of the BSs 102 may also be referred to as an access point, an access terminal, a base, a macro cell, a Node-B, an enhanced Node B (eNB), a gNB, a Home Node-B, a relay node, or a device, or described using other terminology used in the art. The BSs 102 are generally part of a radio access network that may include one or more controllers communicably coupled to one or more corresponding BSs 102.

The wireless communication system 100 is compatible with any type of network that is capable of sending and receiving wireless communication signals. For example, the wireless communication system 100 is compatible with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, an LTE network, a 3rd Generation Partnership Project (3GPP)-based network, a 3GPP 5G network, a satellite communications network, a high altitude platform network, and/or other communications networks.

In one embodiment, the wireless communication system 100 is compatible with the 5G new radio (NR) of the 3GPP protocol, wherein the BSs 102 transmit data using an orthogonal frequency division multiplexing (OFDM) modulation scheme on the DL and the UEs 101 transmit data on the UL using a single-carrier frequency division multiple access (SC-FDMA) or OFDM scheme. More generally, however, the wireless communication system 100 may implement some other open or proprietary communication protocols, for example, WiMAX, among other protocols.

In other embodiments, the BSs 102 may communicate using other communication protocols, such as the IEEE 802.11 family of wireless communication protocols. Further, in some embodiments, the BSs 102 may communicate over licensed spectrums, whereas in other embodiments the BSs 102 may communicate over unlicensed spectrums. The present disclosure is not intended to be limited to the implementation of any particular wireless communication system architecture or protocol. In another embodiment, the BSs 102 may communicate with the UEs 101 using the 3GPP 5G protocols.

LTE and NR systems schedule resource by Downlink Control Information (DCI) in Physical Downlink Control Channel (PDCCH), but this way will require one DCI for each resource. In order to decrease overhead of PDCCH for periodic traffic, we can use Semi-Persistent Scheduling (SPS). With SPS, the BS can allocate downlink resources to a UE periodically.

With Configured Grants (CG), the BS can allocate uplink resources to a UE periodically. Two types of configured uplink grants are defined:

Type 1, wherein an RRC protocol is used to directly determine the configured uplink grant (including the periodicity) to a UE.

Type 2, wherein an RRC protocol defines the periodicity of the configured uplink grant while PDCCH addressed to CS-RNTI can either signal and activate the configured uplink grant or deactivate it; i.e. a PDCCH addressed to CS-RNTI indicates that the uplink grant can be implicitly reused according to the periodicity defined by RRC, until deactivated.

In a RAN #81 meeting, NR IIoT Study Item Description (SID) RP-182090 has been agreed upon and the aspect regarding the enhancement for scheduling for TSN traffic is presented as follows:

Enhancements (e.g. for scheduling) to satisfy QoS for wireless Ethernet when using TSN traffic patterns as specified in TR 22.804.

In RAN2 #105b is meeting, scheduling enhancement for TSN traffic was widely discussed with the meeting participants arriving at the following agreements:

RAN2 assumes that the maximum number of active SPS configurations for a given BWP of a serving cell in the specification is 8 or 16 (For further study)

RAN2 assumes short SPS/CG periodicities and/or multiple SPS/CG configurations and/or combination thereof could be used to mitigate the periodicity misalignment between the TSN periodicity and CG/SPS periodicity. Other solutions not precluded, e.g. to address resource consumption.

Will support "short" SPS periodicities, at least down to 0.5 ms

Ask RAN1 on feasibility, and additionally the feasibility to go down to even lower values, e.g. 2 symbols When multiple Uplink (UL) CG or Downlink (DL) SPS configurations is configured, an offset for each configuration is needed for the calculation of the Hybrid Automatic Repeat reQuest (HARQ) process Identity (ID)

If the periodicity of the TSN traffic is not an integer multiple of the CG/SPS periodicities which NR support, RAN2 tends to use "short periodicity" and "multiple SPS/CG configurations" to solve the problem.

Examples for the TSN traffic with a periodicity not an integer multiple of the CG/SPS periodicities are shown in the following Table 1:

TABLE 1

Non-integer TSN traffic periodicity examples

| Use case | Frequency | Periodicity |
|---|---|---|
| Smart grid | 1200 Hz | 0.833 ms |
| Video based sampling | 60 Hz | 16.667 ms |
| Video based sampling | 30 Hz | 33.333 ms |
| Video based sampling | 24 Hz | 41.667 ms |
| PTP synchronization | 8 Hz | 125 ms |

Based on above agreement, it is feasible to use multiple SPS/CG configurations for one TSN traffic, which is, to use multiple SPS/CG configurations with longer periodicity to solve the non-integer multiple of NR CG/SPS periodicities problem.

Figure 2:
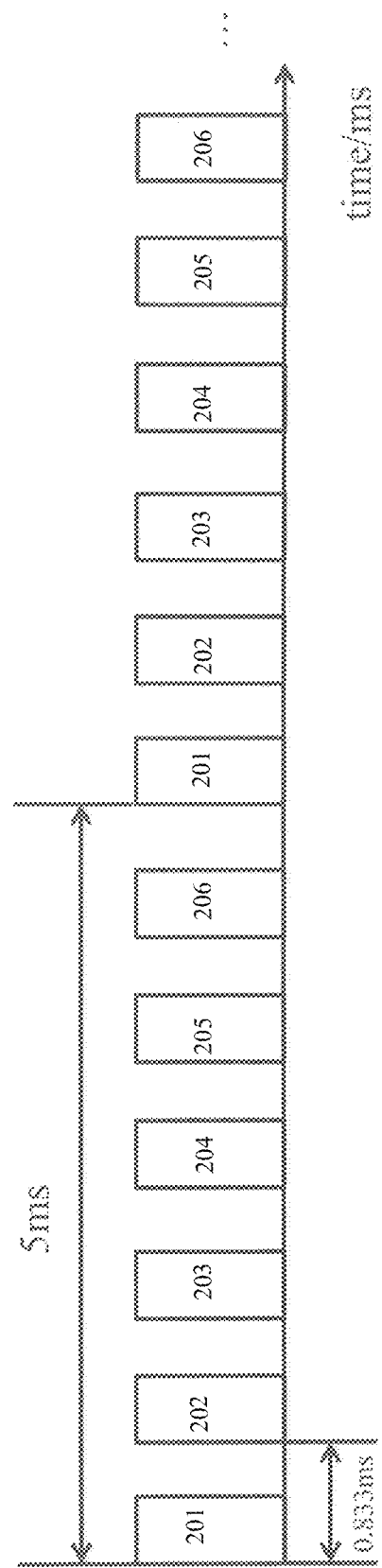
FIG. 2 illustrates an embodiment of configuring the scheduling configurations.

FIG. 2 explains such a solution. In FIG. 2, the periodicity of the TSN traffic is 0.833 ms, and the periodicity of each SPS configurations is 5 ms, which is almost six times of 0.833 ms. An example of the periodicity of the SPS-Config is defined as follows:

| SPS-Config information element |
|---|
| SPS-Config :: =                                  SEQUENCE { periodicity ENUMERATED {ms5, ms10, ms20, ms32, ms40, ms64, ms80, ms128, ms160, ms320, ms640, spare6, spare5, spare4, spare3, spare2, spare1}, nrofHARQ-Processes                  INTEGER (1..8), <text omitted> } |

According to the above, the periodicity of the SPS configuration may be 5 ms, 10 ms, 20 ms, 32 ms, 40 ms, 64 ms, 80 ms, 128 ms, 160 ms, 320 ms, or 640 ms.

The periodicity 0.833 ms multiplied by 6 almost equals to 5 ms. Therefore, a base station can configure 6 SPS configurations, and each one has a periodicity of 5 ms. As shown in FIG. 2, there are a plurality of DL grants 201, 202, 203, 204, 205, and 206. An SPS configuration can determine a DL grant with 5 ms periodicity. Thus, the DL grants 201 are scheduled by the first SPS configuration; the DL grants 202 are scheduled by the second SPS configuration; the DL grants 203 are scheduled by the third SPS configuration; the DL grants 204 are scheduled by the fourth SPS configuration; the DL grants 205 are scheduled by the fifth SPS configuration; and the DL grants 206 are scheduled by the sixth SPS configuration. The base station uses DCI or Radio Resource Control (RRC) signaling to indicate an offset for each SPS configuration.

In view of the above, in order to support one TSN traffic, 6 SPS configurations are required. However, according to the agreement, RAN2 assumes that the maximum number of active SPS configurations for a given BWP of a serving cell in the specification is 8 or 16, which means that the total number of SPS configurations is limited. Therefore, the above solution requiring 6 SPS configurations restricts the number of TSN traffic supported by a single UE.

In order to solve the above problem, the subject disclosure provides several solutions for configuring a scheduling configuration.

Figure 3:
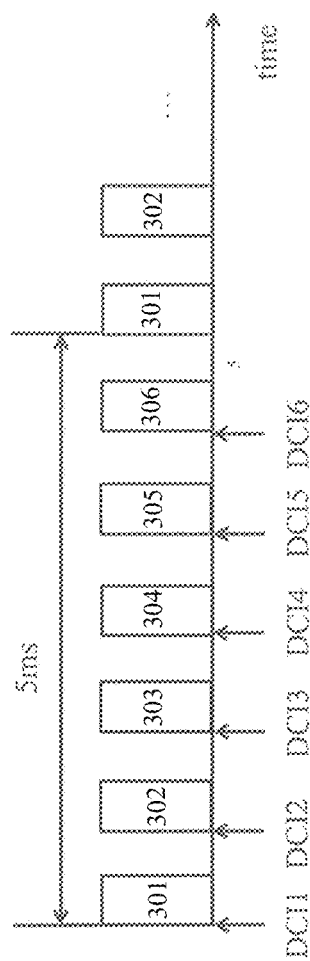
FIG. 3 illustrates an embodiment of configuring the scheduling configurations according to the subject disclosure.

FIG. 3 illustrates a preferred embodiment of the subject disclosure. In FIG. 3, only one SPS configuration is configured for the TSN traffic flow. In addition, a new factor, for example, X, is used to indicate the actual number of DL grants which are configured in a periodicity of the SPS configuration.

As depicted in FIG. 3, the BS configures one SPS configuration which includes the periodicity of 5 ms and the factor X with a value of 6, and transmits the SPS configuration to the UE. Upon receipt of the SPS configuration the UE may determine that resources for 6 DL grants should be reserved in a periodicity of the SPS configuration. However, the occasions of the 6 DL grants are not determined yet.

An example of the factor X is defined in the specification as follows, for example, the factor X may be an integer, and ranges from 1 to 10.

```
SPS-Config ::=                                    SEQUENCE {
periodicity ENUMERATED {ms10, ms20, ms32, ms40, ms64, ms80,
ms128, ms160, ms320, ms640, spare6, spare5, spare4, spare3,
spare2, spare1},
nrofHARQ-Processes                        INTEGER (1..8),
FactorX              INTEGER (1..10),     OPTIONAL,
n1PUCCH-AN           PUCCH-ResourceId
OPTIONAL,     -- Need M
mcs-Table                                 ENUMERATED
                                          {qam64LowSE}
OPTIONAL,     -- Need S
  ...
}
```

After the SPS configuration is transmitted to the UE, the BS further sends multiple DCIs to activate the SPS configuration during the configured SPS periodicity for transmitting TSN traffic.

The number of DCIs is determined according to the factor X. Since the value of X is 6, the BS then transmits 6 DCIs to indicate the occasions of the 6 DL grants. As shown in FIG. 3, DCI1, DCI2, DCI3, DCI4, DCI5, and DCI6 indicate the starting times of the six DL grants 301, 302, 303, 304, 305 and 306. Upon receipt of the DCIs, the UE reserves resources for the six DL grants 301, 302, 303, 304, 305 and 306 as indicated by DCI1, DCI2, DCI3, DCI4, DCI5, and DCI6. The DCI signaling occasions are determined by the base station, and may or may not be evenly distributed in the periodicity of the SPS configuration.

Since the periodicity of the SPS configuration is 5 ms, UE reserves resource according to a DCI every 5 ms. That is, the spacing between two adjacent DL grants configured based on the same DCI is 5 ms.

For FIG. 3, as another embodiment, only one SPS configuration is configured for the TSN traffic flow. In addition, a new indicator, for example, Y, is used to indicate whether there will be multiple DL grants which are configured in a periodicity of the SPS configuration.

As depicted in FIG. 3, the BS configures one SPS configuration which includes the periodicity of 5 ms and the factor Y with a value of 1, and transmits the SPS configuration to the UE. Upon receipt of the SPS configuration, the UE may determine that there will be multiple DL grants which should be reserved in a periodicity of the SPS configuration. However, the occasions and the number of DL grants are not determined yet.

An example of the factor Y is defined in the specification as follows, for example, the factor Y may be an Boolean, and with the value 0 or 1.

```
SPS-Config ::=                                    SEQUENCE {
periodicity ENUMERATED {ms10, ms20, ms32, ms40, ms64, ms80,
ms128, ms160, ms320, ms640,
                       spare6, spare5, spare4, spare3, spare2, spare1},
nrofHARQ-Processes                        INTEGER (1..8),
FactorY             BOOLEAN,     OPTIONAL,
n1PUCCH-AN          PUCCH-ResourceId
OPTIONAL,     -- Need M
  mcs-Table                               ENUMERATED
                                          {qam64LowSE}
OPTIONAL,     -- Need S
  ...
}
```

After the SPS configuration is transmitted to the UE, the BS further sends multiple DCIs to activate the SPS configuration during the configured SPS periodicity for transmitting TSN traffic. And UE send back confirmation for each activation DCI.

The number of DCIs is determined by the BS. For example, the BS transmits 6 DCIs to indicate the occasions of the 6 DL grants. As shown in FIG. 3, DCI1, DCI2, DCI3, DCI4, DCI5, and DCI6 indicate the starting times of the six DL grants 301, 302, 303, 304, 305 and 306. Upon receipt of the DCIs, the UE reserves resources for the six DL grants 301, 302, 303, 304, 305 and 306 as indicated by DCI1, DCI2, DCI3, DCI4, DCI5, and DCI6. The UE will send back activation confirmation for each DCI. The DCI signaling occasions are determined by the base station, and may or may not be evenly distributed in the periodicity of the SPS configuration.

Since the periodicity of the SPS configuration is 5 ms, UE reserves resource according to a DCI every 5 ms. That is, the spacing between two adjacent DL grants configured based on the same DCI is 5 ms.

Please note that the above embodiment is for a DL transmission. If UL transmissions are to be scheduled, the UE may transmit a CG type 2 configuration instead of the SPS configuration for scheduling UL transmissions to the base station.

Figure 4:
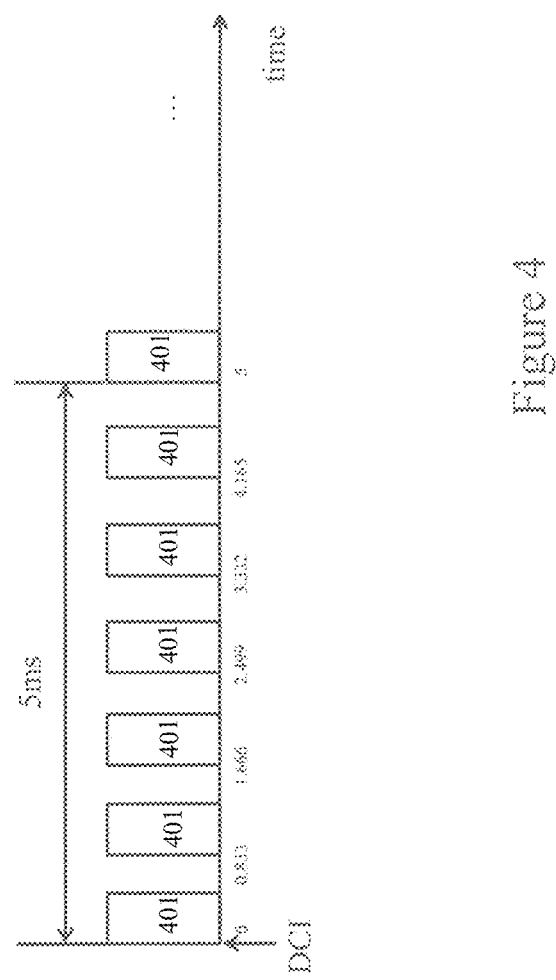
FIG. 4 illustrates an embodiment of configuring the scheduling configurations according to the subject disclosure.

FIG. 4 illustrates another preferred embodiment of the subject disclosure. In this embodiment, only one SPS configuration is configured for the TSN traffic flow. The BS further transmits the new factor X, to indicate the actual number of DL grants, which are configured in a periodicity of the SPS configuration.

Take the TSN traffic with a periodicity of 0.833 ms as the example, the base station can configure one SPS configuration including the periodicity of 5 ms and the factor X with the value of 6, and transmit the SPS configuration to UE.

After the SPS configuration is transmitted to the UE, the BS further sends one DCI to activate the SPS configuration, and defines a regulation for the UE to determine the occasions of the DL grants based on the received SPS configuration and the factor X.

In the preferred embodiment, after receiving the activation DCI, UE will reserve resources after the following occasions:

$$T_{start} + n \times \text{the periodicity of the configured SPS configuration}/X$$

where $T_{start}$ is a starting time of the DL grants, and n is an integer and ranges from 0 to X−1.

According to the above example, namely, the periodicity of the configured SPS configuration is 5 ms, and the value of the Factor X is 6, and the UE would reserve the resource in the nearest symbol after the following occasions: $T_{start}$, $T_{start}$+1×5/6 ms, $T_{start}$+2×5/6 ms, $T_{start}$+3×5/6 ms, $T_{start}$+4×5/6 ms, $T_{start}$+5×5/6 ms, where $T_{start}$ is the location of the received DCI. According to FIG. 4, suppose $T_{start}$ is 0, then the occasions would be at 0 ms, 0.833 ms, 1.666 ms, 2.499 ms, 3.332 ms, and 4.165 ins within the first period. UE then reserves resources for six DL grants within the periodicity of 5 ms, and periodically reserve the resources for six DL grants per 5 ms.

Please note that the above embodiment is for a DL transmission. If UL transmissions are to be scheduled, the UE may transmit a CG type 2 configuration, instead of the SPS configuration, for scheduling UL transmissions to the base station.

The embodiments shown in FIGS. 3 and 4 may also be applied to CG type 1 configuration with minor modifications. Compared with CG type 2 configuration, CG type 1 configuration further includes parameters indicating occasions of reserved resources. Thus, the DCI signaling is not required.

In another preferred embodiment, the BS may configure multiple SPS configurations corresponding to one TSN periodicity.

One example of configuring multiple SPS configurations is presented as follows:

```
SPS-Config-r16 ::=              SEQUENCE {
    sps-Config-ToAddModList-r16 SPS-Config-ToAddModList-r16
OPTIONAL, -- Need ON
    sps-Config-ToReleaseList-r16 SPS-Config-ToReleaseList-r16
OPTIONAL, -- Need ON
}
SPS-Config-ToAddModList-r16 ::= SEQUENCE (SIZE
(1..maxConfigSPS-r16)) OF SPS-Config-r16
SPS-Config-ToReleaseList-r16 ::= SEQUENCE (SIZE
(1..maxConfigSPS-r16)) OF SPS-Config-r16
SPS-Config-r16 ::=          SEQUENCE {
    sps-ConfigIndex-r16     SPS-ConfigIndex-r16,
    periodicity                  ENUMERATED {sym2, sym7,
sym1x14, sym2x14, sym4x14, sym5x14, sym8x14, sym10x14, sym16x14,
sym20x14,
                                    sym32x14, sym40x14,
sym64x14, sym80x14, sym128x14, sym160x14, sym256x14, sym320x14,
sym512x14,
                                    sym640x14, sym1024x14,
sym1280x14, sym2560x14, sym5120x14},
    nrofHARQ-Processes           INTEGER (1..16),
    }
<Text omitted>
}
```

According to the above, the periodicities of the SPS configuration could be sym2, sym7, sym1×14, sym2×14, sym4×14, sym5×14, sym8×14, sym10×14, sym16×14, sym20×14, sym32×14, sym40×14, sym64×14, sym80×14, sym128×14, sym160×14, sym256×14, sym320×14, sym512×14, sym640×14, sym1024×14, sym1280×14, sym2560×14, sym5120×14, namely, the periodicity of the SPS configuration may be 2 symbols, 7 symbols, 1×14 symbols, . . . 5120×14 symbols. More details about periodicities mentioned here are provided in 3GPP TS 38.331, Section 6.3.2.

The length of the symbols is relevant to the frequency, for example, suppose the frequency of the Subcarrier Spacing (SCS) is 30 KHz, the length of sym1×14 is 0.5 ms, the length of sym7 is 0.25 ms, and the length of sym2 is 0.071 ms. Suppose the SCS is 15 KHz, the length of sym1×14 is 1 ms, the length of sym16×14 is 16 ms, the length of sym7 is 0.5 ms, and the length of sym2 is 0.143 ms, etc.

Figure 5:
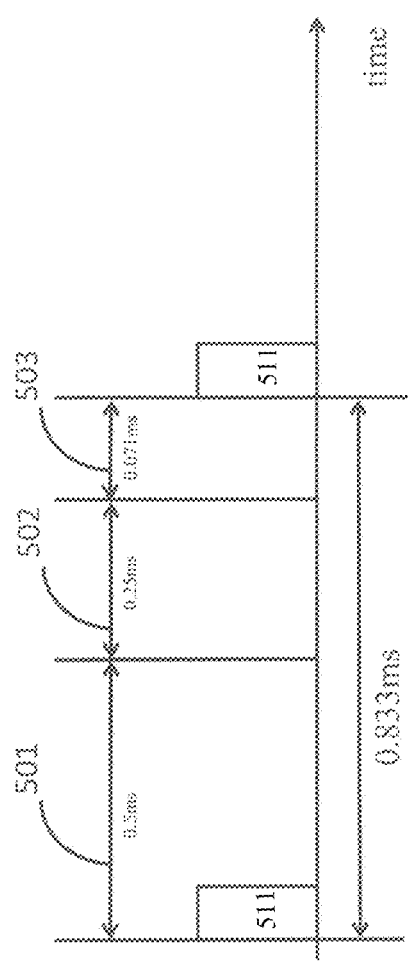
FIG. 5 illustrates an embodiment of configuring the scheduling configurations according to the subject disclosure.

For example, the BS may configure three SPS configurations, each configuration has a periodicity. As shown in FIG. 5, the three different periodicities maybe 0.5 ms, 0.25 ms, and 0.071 ms.

After the configuration, the BS sends a DCI to UE, to activate the SPS configurations. After receiving the activation DCI, the UE activates the SPS configuration, and the occasions of the reserved resources are represented as follows:

$$T_{start} + N \times \text{sum (periodicities in three SPS configurations)}$$

where $T_{start}$ is a starting time of the DL grants; N is an integer, and ranges from 1 to infinity.

FIG. 5 illustrates a preferred embodiment of the subject disclosure. Regarding the TSN traffic with a non-integer periodicity, the BS may configure multiple SPS configurations with at least two different periodicities. The sum of periodicities of the multiple SPS configurations corresponds to one TSN periodicity.

As shown in FIG. 5, the TSN traffic has a periodicity of 0.833 ms, three SPS configurations with three different periodicities 501, 502 and 503 are configured. For example, the periodicity 501 is 0.5 ms, the periodicity 502 is 0.25 ms, and the periodicity 503 is 0.071 ms. The sum of the three periodicities is 0.821 ms, which is close to the periodicity of 0.833 ms. Please note that the number of configured SPS configurations and the periodicities of the configured SPS configurations are not limited to the above embodiment. For example, the BS may configure four SPS configurations with the periodicities of 0.25 ms, 0.25 ms, 0.25 ms, and 0.071 ms.

Additional examples for other non-integer TSN traffic periodicities as indicated in Table 1 above are presented as follows:

0.833 ms: 30 kHz SCS, 0.5 (sym1×14)+0.25 (sym7)+ 0.071 (sym2)=0.821 ms 16.667 ms: 15 kHz SCS, 16 (sym16×14)+0.5 (sym7)+ 0.143 (sym2)=16.643 ms 33.333 ms: 15 KHz SCS, 32 (sym32×14)+1 (sym1×14)+ 0.143 (sym2)=33.143 ms 41.667 ms: 15 kHz SCS, 40 (sym40×14)+1 (sym1×14)+ 0.5 (sym7)+0.143 (sym2)=41.643 ms 125 ms: 15 kHz SCS, 80 (sym80×4)+40 (sym40×14)+5 (sym5×14)=125 ms After the multiple SPS configurations are transmitted, the BS further transmits a DCI to UE, to activate the multiple SPS configurations.

UE receives the DCI activating the SPS configurations, and reserves the resource after the following occasions:

$$T_{start} + N \times \text{sum (periodicities of three SPS configurations)}$$

where $T_{start}$ is a starting time of the DL grants, N is an integer, and ranges from 1 to infinity.

In another embodiment, after the multiple SPS configurations are transmitted, the BS further transmits multiple DCIs to the UE, to activate the multiple SPS configurations.

UE receives multiple DCIs for activating the SPS configurations, and reserves the resource. That is, UE will configure DL assignments for each SPS configuration according to the periodicity in each SPS configuration.

There will be overbooked resource, for example, DL assignments for this TSN traffic, UE will disable the overbooked resource, for instance, DL assignments or only enable resource, such as DL assignments, according to rules or indications from BS.

For example, the UE disables the overbooked resource, e.g. DL assignments according to rules not in following occasions. Alternatively, the UE only enables resource such as DL assignments, according to rules in following occasions.

$$T_{start} + N \times \text{sum (periodicities of three SPS configurations)}$$

where $T_{start}$ is a starting time of the DL grants, N is an integer, and ranges from 1 to infinity.

In yet another example, UE disables the overbooked resource e.g. DL assignments or only enables resource e.g. DL assignments, according to indication from BS. For example, the BS indicates a number Z to UE, which is used to indicate UE to only enable the first configured DL assignment every Z DL assignments.

Please note that the above embodiment is for a DL transmission. If UL transmissions are to be scheduled, the UE may transmit multiple CG type 2 configurations, instead of the multiple SPS configurations, for scheduling UL transmissions to the base station.

Figure 6:
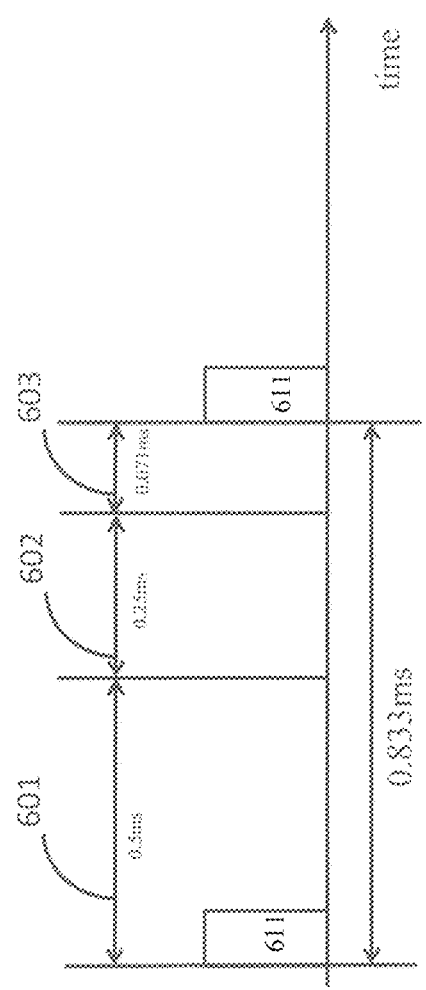
FIG. 6 illustrates an embodiment of configuring the scheduling configurations according to the subject disclosure.

Alternatively, the BS may configure one SPS configuration with multiple periodicities corresponding to one TSN periodicity. FIG. 6 illustrates another preferred embodiment of the subject disclosure. Regarding the TSN traffic with non-integer periodicity, one SPS configuration with at least two different periodicities is utilized. The sum of periodicities of the multiple SPS configurations corresponds to one TSN periodicity.

According to FIG. 6, the TSN traffic has a periodicity of 0.833 ms, the BS can configure one SPS configuration with three different periodicities 601, 602, and 603, which are 0.5 ms, 0.25 ms and 0.071 ms. The sum of the three periodicities is 0.821 ms, which is close to the periodicity of 0.833 ms.

One example for the SPS configuration is presented as follows:

```
SPS-Config ::=              SEQUENCE {
   periodicityList          SEQUENCE (SIZE(1..maxSPSperiodicity))
                            OF periodicity
periodicity                 ENUMERATED {ms10, ms20, ms32, ms40,
ms64, ms80, ms128, ms160, ms320, ms640, spare6, spare5, spare4,
spare3, spare2, spare1},
nrofHARQ-Processes          INTEGER (1..8),
   n1PUCCH-AN               PUCCH-ResourceId
OPTIONAL,    -- Need M
   mcs-Table                ENUMERATED {qam64LowSE}
OPTIONAL,    -- Need S
   ...
}
```

After the SPS configuration is transmitted to the UE, the BS further sends a DCI to activate the SPS configuration. After receiving the activation DCI, the UE reserves the resource after the following occasions:

$$T_{start} + N \times \text{sum (periodicities in three SPS configurations,}$$

$$\text{or three periodicities in one SPS configuration)}$$

where $T_{start}$ is a starting time of the DL grants, N is an integer, and ranges from 1 to infinity.

Please note that the above embodiment is for a DL transmission. If UL transmissions are to be scheduled, the UE may transmit multiple CG configurations, instead of the multiple SPS configurations, for scheduling UL transmissions to the base station.

It should be noted that the SPS and CG configuration is targeted for the flow, bearer or logical channel. Namely, the logical channel identity in the SPS or CG configuration is indicated such that UE knows which service to map based on the SPS or CG configuration. For example, the Quality of Service (QoS) flow id, radio bearer id, and/or logical channel id could be incorporated into the SPS or CG configuration, to indicate to which service the SPS or CG configuration is mapped.

An example of incorporating the logical channel id into SPS configuration is presented as follows:

```
SPS-Config ::=              SEQUENCE {
    periodicity             ENUMERATED {ms10, ms20,
ms32, ms40, ms64, ms80, ms128, ms160, ms320, ms640,
                            spare6,   spare5,   spare4,
spare3, spare2, spare1},
nrofHARQ-Processes          INTEGER (1..8),
LogicalChannelIdentity ::=  INTEGER (1..maxLC-ID)
    n1PUCCH-AN                          PUCCH-ResourceId
OPTIONAL,    -- Need M
    mcs-Table                ENUMERATED {qam64LowSE}
OPTIONAL,    -- Need S
    ...
}
```

According to the present disclosure, the UE or BS will store the DL or UL grant for each one of the resource reservation occasions.

In some embodiments, if the SPS configuration or CG type 2 configuration is applied, UE or BS will store DL or UL grant for resource occasions as illustrated in the embodiments related to FIGS. 3-6. In some other embodiments, if the CG type 1 configuration is applied, the BS would determine the resource reservation occasions based on CG type 1 configuration.

If the CG type 1 configuration includes a periodicity T and resource reservation factor X, for example T=5 ms, and X=6, then BS will reserve the resource for the CG type 1 configuration according to following rules:

Reserve the resource in the nearest symbol after the following locations:

$T_{start}$, $T_{start} + 1 \times 5/6$ ms, $T_{start} + 2 \times 5/6$ ms, $T_{start} + 3 \times 5/6$ ms, $T_{start} + 4 \times 5/6$ ms, $T_{start} + 5 \times 5/6$ ms where $T_{start}$ is a starting time of the UL grants and is indicated by the parameter "timeDomainOffset" in the CG type 1 configuration.

If the CG type 1 configuration includes different periodicity in each configuration, or one CG type 1 configuration with multiple periodicities, the UE will reserve the resource based on the following rule:

$T_{start} + N \times$ sum (periodicities in three SPS configuration, or three periodicities in one SPS configuration)

where $T_{start}$ a starting time of the UL grants and is indicated by the parameter "timeDomainOffset" in the CG type 1 configuration; N is an integer, and ranges from 1 to infinity.

In an embodiment, regarding the solution with multiple SPS or CG configurations, an offset value for HARQ process id needs to be calculated for each SPS or CG configuration. However, this results in HARQ process overbooking for this solution. That is, that reserved HARQ process number is larger than the required HARQ process number. According to some preferred embodiments of the present disclosure, the offset for the HARQ process identity is configured per QoS flow, per radio bearer, per logical channel, or per scheduling configuration group. In a preferred embodiment, the one or more scheduling configurations for the specific logical channel share a common offset for the HARQ process identity. For example, only the SPS or CG configuration with the periodicity 501 in FIG. 5 includes the offset for the HARQ process identity. In another preferred embodiment, all of the scheduling configurations have the same offset for the HARQ process identity. For example, all the SPS configurations with the same QoS flow identity, radio bearer identity, or logical channel identity have the same offset for the HARQ process identity.

Figure 7:
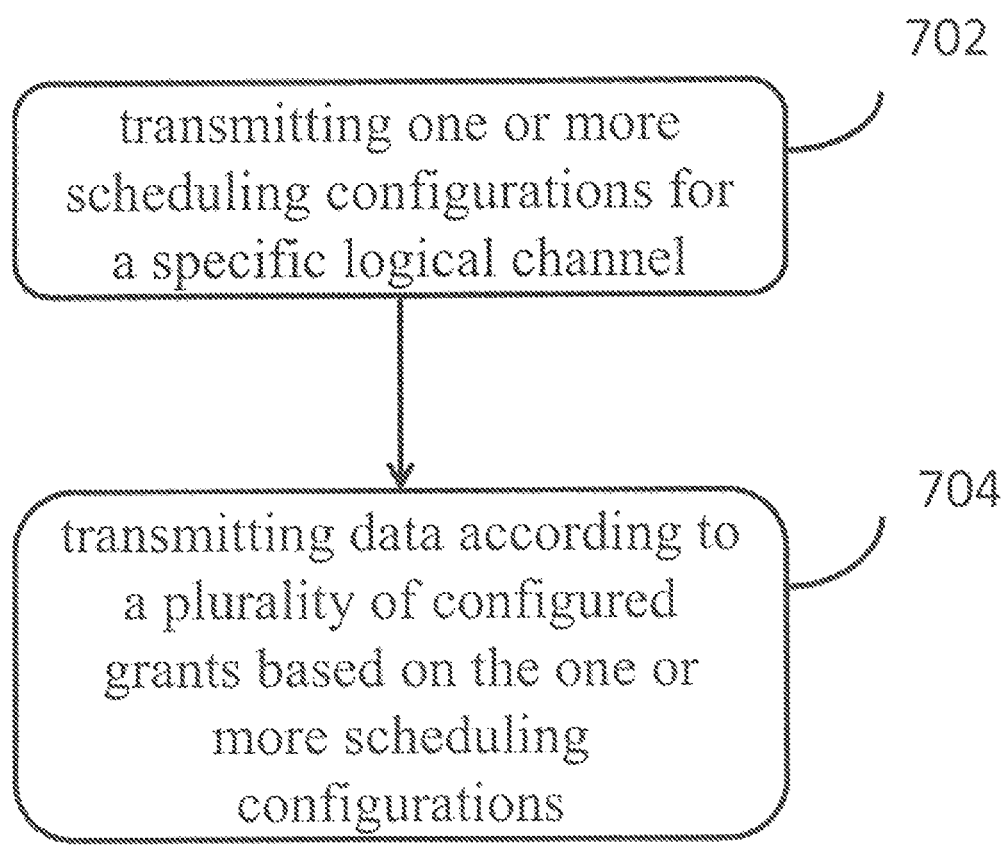
FIG. 7 illustrates a method of configuring the scheduling configurations according to a preferred embodiment of the subject disclosure.

Please refer to FIG. 7. FIG. 7 illustrates a method for configuring a scheduling configuration. The method may be performed by a base station for DL transmission or by a UE for UL transmission. The method comprises: transmitting (step 702) one or more scheduling configurations for a specific logical channel, for example, the SPS or CG configurations, each scheduling configuration comprises at least one of: a periodicity, a factor for configured grant and an offset for HARQ process identity; and transmitting (step 704) data according to a plurality of configured grants based on the one or more scheduling configurations. In a preferred embodiment, the method further comprises releasing the scheduling configuration if the transmission for a QoS flow, a radio bearer, or a logical channel is completed.

In some embodiments, if more than one scheduling configurations are transmitted, the scheduling configurations have at least two different periodicities, such as the combination of 0.5 ms, 0.25 ms, and 0.071 ms or the combination of 0.25 ms, 0.25 ms, 0.25 ms, and 0.071 ms. Persons with ordinary skill in the art can derive other combinations of scheduling configurations with different periodicities based on the present disclosure.

In some other embodiments, only one scheduling configuration is transmitted, and the factor X for configured grant is included in the scheduling configuration for indicating how many grants are configured in the periodicity of the scheduling configuration. One or more control information, for example, DCI, which determines occasions of the plurality configured grants, are transmitted.

In some embodiments, only one control information is transmitted indicating a starting occasion of the plurality of configured grants. The spacing between any two adjacent configured grants is determined by the periodicity of the scheduling configuration divided by the factor for configured grant.

In some other embodiments, the number of the control information equals to a value of the factor for configured grant, and each control information indicates a starting occasion of a plurality of configured grants for the scheduling configuration. The spacing between any two adjacent configured grants, which are determined by the same control information, equals to the periodicity of the scheduling configuration. For example, the DCI1 in FIG. 3 indicating a starting occasion of DL grants 301 and the spacing between two adjacent DL grants 301 equals to the periodicity of the scheduling configuration; and the DCI2 in FIG. 3 indicating a starting occasion of DL grants 302 and the spacing between two adjacent DL grants 302 equals to the periodicity of the scheduling configuration.

In some embodiments, more than one scheduling configurations are transmitted, and a sum of periodicities of the scheduling configurations determines a spacing between two adjacent configured grants in the plurality of configured grants. For example, the spacing between two DL grants 511 in FIG. 5 is determined by the sum of periodicities 501, 502 and 503.

In some embodiments, only one scheduling configuration is transmitted, the scheduling configuration has a plurality of periodicities, and a sum of the periodicities of the scheduling configuration determines the spacing between two adjacent configured grants in the plurality of configured grants. For example, the spacing between two DL grants 611 in FIG. 6 is determined by the sum of periodicities 601, 602 and 603.

In an embodiment, each of the one or more scheduling configurations further comprises at least one of a Quality of Service (QoS) flow identity, a radio bearer identity, and a logical channel identity.

In some embodiments, the offset for the HARQ process identity is configured per QoS flow, per radio bearer, per logical channel, or per scheduling configuration group. In a preferred embodiment, the one or more scheduling configurations for the specific logical channel may share a common offset for the HARQ process identity. Alternatively, the one or more scheduling configurations for the specific logical channel may have the same offset for the HARQ process identity.

Figure 8:
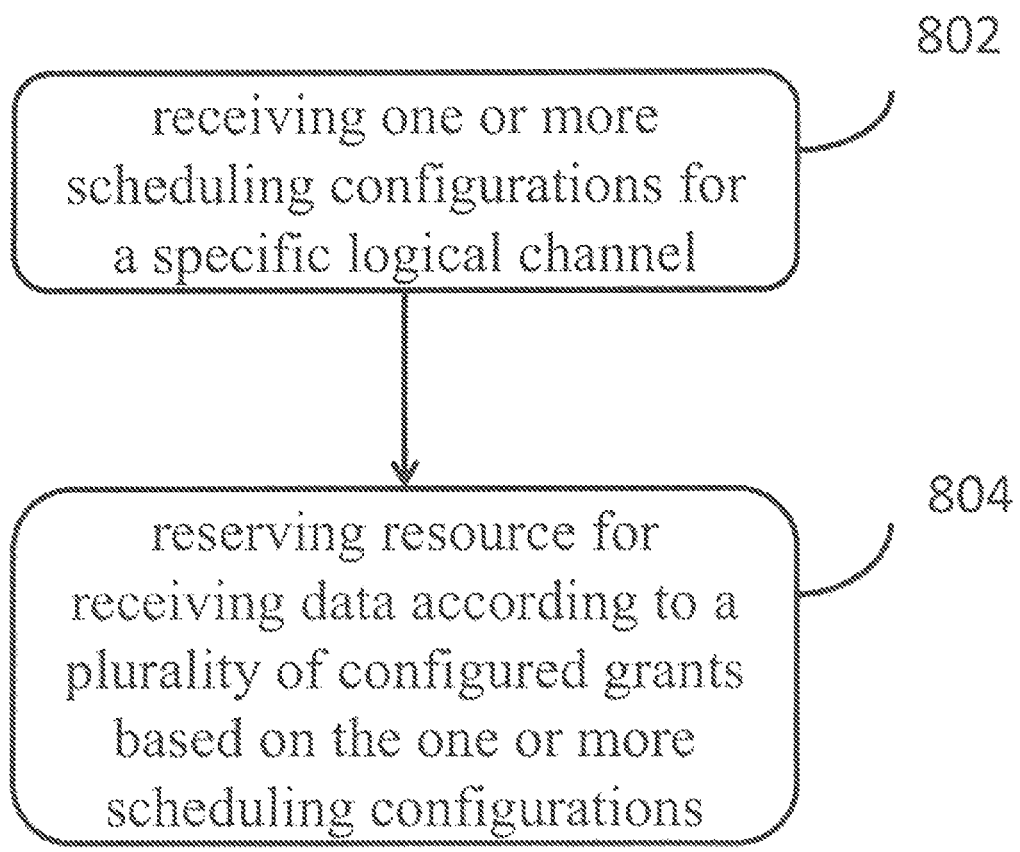
FIG. 8 illustrates a method of configuring the scheduling configurations according to a preferred embodiment of the subject disclosure.

Please refer to FIG. 8. FIG. 8 illustrates a method for configuring a scheduling configuration. The method may be performed by a UE for DL transmission or by a base station for UL transmission and the method comprises: receiving (step 802) one or more scheduling configurations for a specific logical channel. The scheduling configurations may be the SPS or CG configurations, and each scheduling configuration comprises at least one of: a periodicity, a factor for configured grant and an offset for HARQ process identity. The method further comprises reserving (step 804) resource for receiving data according to a plurality of configured grants based on the one or more scheduling configurations. In a preferred embodiment, the method further comprises releasing the scheduling configuration if the transmission for a QoS flow, a radio bearer, or a logical channel is completed.

In one embodiment, if more than one scheduling configurations are received, the scheduling configurations have at least two different periodicities, such as the combination of 0.5 ms, 0.25 ms, and 0.071 ms or the combination of 0.25 ms, 0.25 ms, 0.25 ms, and 0.071 ms. Persons with ordinary skill in the art can derive other combinations of scheduling configurations with different periodicities based on the present disclosure.

In some other embodiments, only one scheduling configuration is received, and the factor for configured grant is included in the scheduling configuration for indicating how many grants are configured in the periodicity of the scheduling configuration. One or more control information, for example, DCI, which determines occasions of the plurality configured grants are further received.

In some embodiments, only one control information is received, and the control information indicates a starting occasion of the plurality of configured grants. The spacing between any two adjacent configured grants is determined by the periodicity of the scheduling configuration divided by the factor for configured grant.

In some other embodiments, the number of the control information equals to a value of the factor for configured grant, and each control information indicates a starting occasion of a plurality of first configured grants for the scheduling configuration. The spacing between any two adjacent first configured grants equals to the periodicity of the scheduling configuration. For example, the DCI in FIG. 3 indicating a starting occasion of DL grants 301 and the spacing between two adjacent DL grants 301 equals to the periodicity of the scheduling configuration.

In an embodiment, more than one scheduling configurations are received, and a sum of periodicities of the scheduling configurations determines a spacing between two adjacent configured grants in the plurality of configured grants. For example, the spacing between two DL grants 511 in FIG. 5 is determined by the sum of periodicities 501, 502 and 503.

If only one scheduling configuration is received, the scheduling configuration has a plurality of periodicities, and a sum of the periodicities of the scheduling configuration determines the spacing between two adjacent configured grants in the plurality of configured grants. For example, the spacing between two DL grants 611 in FIG. 6 is determined by the sum of periodicities 601, 602 and 603.

In some embodiments, each of the one or more scheduling configurations further comprises at least one of a Quality of Service (QoS) flow identity, a radio bearer identity, and a logical channel identity.

In some embodiments, the offset for the HARQ process identity is configured per QoS flow, per radio bearer, per logical channel, or per scheduling configuration group. In a preferred embodiment, the one or more scheduling configurations for the specific logical channel share a common offset for the HARQ process identity. Alternatively, the one or more scheduling configurations for the specific logical channel have the same offset for the HARQ process identity.

Figure 9:
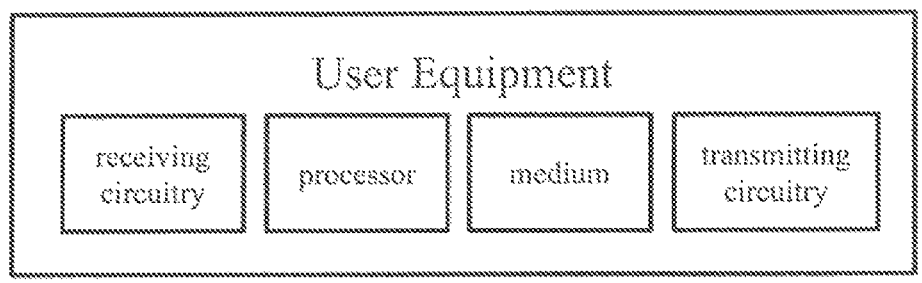
FIG. 9 illustrates a block diagram of a UE according to the embodiments of the present disclosure.

FIG. 9 depicts a block diagram of a UE according to the embodiments of the present disclosure. The UE 101 may include a receiving circuitry, a processor, and a transmitting circuitry. In one embodiment, the UE 101 may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method with the at least one receiver, the at least one transmitter and the at least one processor. The method according to an embodiment of the present disclosure, for example, is the methods shown in FIGS. 7 and 8.

Figure 10:
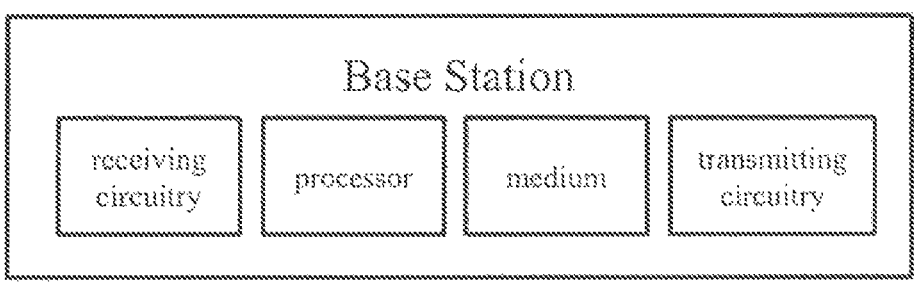
FIG. 10 illustrates a block diagram of a BS according to the embodiments of the present disclosure.

FIG. 10 depicts a block diagram of a BS according to the embodiments of the present disclosure. The BS 102 may include a receiving circuitry, a processor, and a transmitting circuitry. In one embodiment, the BS may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method with the at least one receiver, the at least one transmitter and the at least one processor. The method according to an embodiment of the present disclosure, for example, is the methods shown in FIGS. 7 and 8.

The method of the present disclosure can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. A method, comprising:
   transmitting one or more scheduling configurations for a specific logical channel, wherein each scheduling configuration comprises an offset for hybrid automatic repeat request process identity and the one or more scheduling configurations comprise a plurality of periodicities; and
   transmitting data according to a plurality of configured grants based on the one or more scheduling configurations, the plurality of configured grants comprising two adjacent configured grants, wherein a spacing between the two adjacent configured grants is determined based at least in part on a sum of the plurality of periodicities of the one or more scheduling configurations,
   wherein the offset for the hybrid automatic repeat request process identity is configured for the logical channel and is common to each scheduling configuration of the one or more scheduling configurations.

2. The method of claim 1, wherein the one or more scheduling configurations comprise a more than one scheduling configurations corresponding to a single time-sensitive networking periodicity.

3. The method of claim 1, wherein the plurality of periodicities of the one or more scheduling configurations comprise at least three different periodicities.

4. A method comprising:
   receiving one or more scheduling configurations for a specific logical channel, wherein each scheduling configuration comprises an offset for hybrid automatic repeat request process identity and the one or more scheduling configurations comprise a plurality of periodicities; and
   reserving resource for receiving data according to a plurality of configured grants based on the one or more scheduling configurations, the plurality of configured grants comprising two adjacent configured grants, wherein a spacing between the two adjacent configured grants is determined based at least in part on a sum of the plurality of periodicities of the one or more scheduling configurations,
   wherein the offset for the hybrid automatic repeat request process identity is configured for the logical channel and is common to each scheduling configuration of the one or more scheduling configurations.

5. The method of claim 4, wherein the one or more scheduling configurations comprise more than one scheduling configurations and the plurality of periodicities comprise at least two different periodicities.

6. The method of claim 4, wherein:
   the one or more scheduling configurations comprise only one scheduling configuration.

7. The method of claim 6, wherein factor for configured grant is included in the only one scheduling configuration for indicating how many grants are configured a periodicity of the plurality of periodicities.

8. The method of claim 4, further comprising receiving one or more control information which determines occasions of the plurality configured grants.

9. The method of claim 8, wherein a number of the control information equals to a value of a factor for configured grant, and each control information indicates a starting occasion of a plurality of first configured grants for a scheduling configuration of the one or more scheduling configurations.

10. The method of claim 9, wherein each scheduling configuration of the one or more scheduling configurations further comprises a periodicity of the plurality of periodicities and a spacing between any two adjacent first configured grants equals to the periodicity of the scheduling configuration.

11. The method of claim 8, wherein if only one control information is received, the control information indicating a starting occasion of the plurality of configured grants.

12. The method of claim 11, wherein the spacing between the two adjacent configured grants is further determined based at least in part on a factor for configured grant.

13. The method of claim 4, wherein each of the one or more scheduling configurations further comprises a quality of service flow identity, a radio bearer identity, a logical channel identity, or some combination thereof.

14. The method of claim 4, wherein the offset for the hybrid automatic repeat request process identity is configured per quality of service flow, per radio bearer, or per scheduling configuration group.

15. The method of claim 14, wherein the one or more scheduling configurations for the specific logical channel have the same offset for the hybrid automatic repeat request process identity.

16. The method of claim 4, wherein the one or more scheduling configurations are semi-persistent scheduling or configured grant configurations.

17. The method of claim 4, wherein the one or more scheduling configurations comprise only one scheduling configuration and a factor for configured grant is included in the scheduling configuration for indicating multiple grants are configured in a periodicity of the plurality of periodicities.

18. The method of claim 4, wherein the one or more scheduling configurations comprise more than one scheduling configurations, more than one control information each indicating a starting occasion of a plurality of first configured grants for the scheduling configuration are received, the configured grants are determined according to each scheduling configuration and control information, and the configured grants are enabled according to a predefined regulation or an indication.

19. The method of claim 18, wherein:
the first configured grant is enabled with a periodicity of the sum of the plurality of periodicities of the one or more scheduling configurations;
the first configured grant is enabled every Z configured grants, and Z is a configured integer;
or a combination thereof.

20. An apparatus comprising:
a receiver that receives one or more scheduling configurations for a specific logical channel, wherein each scheduling configuration comprises an offset for hybrid automatic repeat request process identity and the one or more scheduling configurations comprise a plurality of periodicities; and
a processor that reserves resource for receiving data according to a plurality of configured grants based on the one or more scheduling configurations, the plurality of configured grants comprising two adjacent configured grants, wherein a spacing between the two adjacent configured grants is determined based at least in part on a sum of the plurality of periodicities of the one or more scheduling configurations,
wherein the offset for the hybrid automatic repeat request process identity is configured for the logical channel and is common to each scheduling configuration of the one or more scheduling configurations.

* * * * *